June 3, 1952      W. L. HUME      2,599,389

HYDRAULIC FITTING

Filed Oct. 17, 1949

INVENTOR.
WILLIAM L. HUME
BY
J. Edwin Coates
ATTORNEY

Patented June 3, 1952

2,599,389

UNITED STATES PATENT OFFICE 2,599,389

HYDRAULIC FITTING

William L. Hume, Los Angeles, Calif., assignor to Douglas Aircraft Company, Inc., Santa Monica, Calif.

Application October 17, 1949, Serial No. 121,775

4 Claims. (Cl. 285—124)

This invention relates to coupling devices, and more particularly to coupling devices for tube fittings.

The coupling device of the present invention, in the broadest aspects thereof, comprises means presenting an internal cylindrical wall surface for closely receiving the one end of the tube, which wall surface is enlarged at the one end thereof to form a substantially toroidal shoulder adapted to be engaged by an external circumferential bead previously formed about the tube adjacent the end received within the cylindrical wall surface. The bead is held against the shoulder by a compression member sleeving the tube and adapted to be threadedly connected to the means receiving the end of the tube. The end of the compression member adjacent the tube receiving means is formed with a toroidal surface of substantially the same diameter as the shoulder, which in turn has substantially the same diameter as the external bead of the tube. The bead as it is engaged between the shoulder and the toroidal surface of the compression member is thus enclosed within a recess of substantially the same size and shape as the bead itself, and as the surfaces defining the recess are surfaces of rigid bodies, the tube is rigidly held against longitudinal movement.

Although the surfaces forming the recess enclosing the bead closely engage the surface of the bead and thus coact with the cylindrical wall surface closely receiving the end of the tube to effect a seal of the jointure established, means are nevertheless provided for further sealing the clearance between the tube and the cylindrical wall surface. This means preferably comprises at least one annular element of resilient and substantially non-compressible material fitted within a circumferentially extending groove or channel formed in the cylindrical wall surface. The sealing element projects inwardly of said wall surface to sealingly engage the tube about the entire circumference thereof.

Although prior devices have been heretofore proposed for coupling tubes or the like in which the jointure effected is brought about by the restraining action of some means on a beaded section of the tube, these prior devices have not been entirely successful in use. These prior devices have either been ones in which the tube was outwardly expanded to form the bead after the end thereof was inserted within the device or ones in which the surfaces between which the bead was clamped were those of bodies or elements of resilient material. Of the first mentioned group or class, these devices could not be used except where special forming tools were available for expanding the tube wall outwardly after the end of the tube was inserted into the device. Such coupling devices obviously could not be readily beaded in the field and were difficult to use in close quarters, as in aircraft construction and maintenance. Furthermore, unless the tube was formed of dead soft material it was a physical impossibility to fully expand the tube wall into the enlarged wall surface intended to receive the bead and the mechanical jointure was consequently impaired by the relatively small bead eventually formed after the "spring back" of the wall section expanded. These devices were also difficult to seal, particularly on both sides of the jointure effected by the device.

In the coupling device of the present invention the bead can be formed during manufacture of the tube, making unnecessary any beading operation during the assembly of the tube in fitting. Moreover, the coupling of the present invention can be used with relatively hard metals or other materials which can be provided with a bead during manufacture and which can not be readily beaded in the field.

In the type of previously proposed coupling devices where the members restraining movement of the bead were resilient ones which also served in most instances as gasket or sealing elements, the tube was not rigidly or solidly anchored as in the device of the present invention where the surfaces engaging the opposite sides of the bead are those of rigid metallic members. A further difficulty inherent in these prior devices resulted from the fact that the bead restraining means and the sealing means were one and the same, so that failure of this means produced not only a failure of the seal, but a failure of the jointure as well.

In the coupling device of the present invention the rigid toroidal surfaces which restrain the beaded wall portion of the tube also function as sealing means so that failure of the resilient sealing elements does not result in a complete failure of the seal. On the other hand, any injury or damage to the bead which might impair the sealing action of the toroidal surfaces does not affect the sealing action of the separate resilient elements.

The sealing elements of the present invention are disposed between the bead and the adjacent end of the tube so that there are no unsealed paths through which the fluids confined by the tube, even under relatively high pressure, can flow. As above mentioned, this was not true of the coupling devices which required outward expansion of the tube wall after the tube had been inserted into the fitting.

Other features and advantages of the present invention will be hereinafter apparent from the following description, particularly when taken in connection with the accompanying drawing in which the contours of the toroidal surfaces enclosing the beads have been slightly exaggerated to more clearly illustrate the same.

Figure 1:
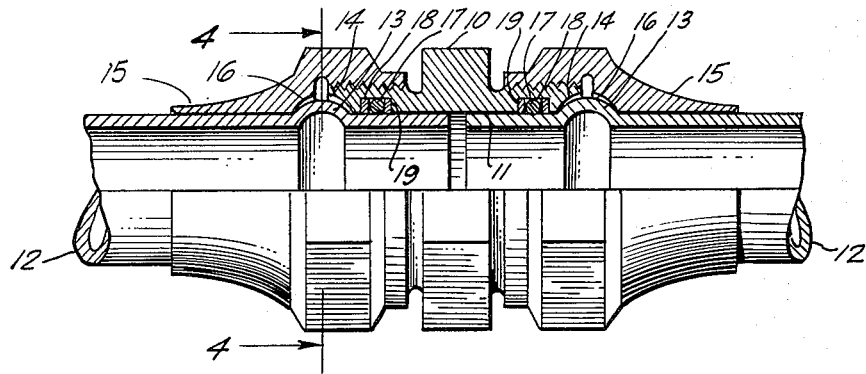
Fig. 1 is an elevational view, partly in section, of one embodiment of the present invention.

The coupling device of the present invention, referring now to the drawing, and more particularly to Fig. 1 thereof, illustrating one embodiment of the coupling device which comprises a body member 10 provided with a counter bore presenting an internal cylindrical wall surface 11 for closely receiving the adjacent ends of tubes 12 to be joined together in an end-to-end relation. The tubes 12 are each provided with an external circumferential bead 13 of a larger diameter than the tubes. The bead of each tube is spaced from the end thereof a distance slightly less than half the length of the cylindrical wall surface 11 and is formed prior to the assembly of each tube with the coupling device.

It is now preferred to form the bead on each tube by inserting the end of the latter in a die having a cylindrical wall surface of the same diameter as the cylindrical wall surface 11. The wall of the surface of the die is enlarged to form a toroidal surface into which the tube wall is upset or forced to form a bead. Beads formed by such an operation are far more uniform in size and shape than those formed by rolling a mandrel or the like about the inner surface of the tube.

Furthermore, the outer diameter of the tube wall during the bead forming operation will, of course, also be caused to conform to the diameter of the cylindrical surface of the die. This is particularly true of the sections of the tube wall adjacent the opposite sides of the bead. It follows that by closely maintaining the diameter of the counter bore of the body member a very close fit may be had between the tube and the bore of the body member.

The opposite ends of the cylindrical wall surface 11 are enlarged to form a pair of oppositely facing, substantially toroidal shaped shoulders 14. The oppositely facing shoulders 14 are adapted to be engaged by the beads 13 of the tubes 12 when the latter are inserted within the opposite ends of the counter bore of the body member 10. As the bead of each tube is spaced from the end of the tube a distance less than half the length of the cylindrical wall, the beads 13 will be brought into engagement with the oppositely facing shoulders 14 without mutual interference of the end surfaces of the tubes. In other words, the end surfaces of the tubes 12 will be held slightly apart after the beads are brought into engagement with the shoulders 14.

Each tube carries a compression member which may consist of an identical sleeve nut 15 which closely circumscribes the tube. Each nut, preferably, is formed with a plurality of tool-engaging surfaces so that it may be turned by a suitable wrench or tool. The sleeve nuts 15 are formed with female threads adapted to be engaged with male threads formed about the opposite end portions of the body member 10. The engaged threads not only connect the sleeve nuts 15 to the opposite ends of the body member but also when the sleeve nuts are properly turned draw the latter toward the opposite ends of the body member.

The inner ends of the sleeve nuts 15 are each formed with toroidal surfaces 16 of substantially the same diameter as the toroidal shoulders 14 formed by the enlarged wall portions of the cylindrical wall surface of the counter bore of the body member. The surfaces 16, as the sleeve nuts 15 are drawn inwardly of the opposite ends of the body member, are brought into compressive engagement with the exposed surfaces of the beads 13 to urge the beads against the shoulders 14 formed at the opposite ends of the body member 10. It will be seen that the toroidal surfaces 16 coact with the toroidal shoulders 14 to form internal recesses the walls of which engage the surfaces of the beads 13 and hold the beads, and consequently the tubes, against longitudinal movement.

As a stronger union or jointure, as well as a more rigid one, is had if the toroidal surfaces closely engage at least the surfaces of the root portions of the bead, that is, those surfaces of the bead disposed on opposite sides of the bead which lie closely adjacent the normal or unexpanded wall sections of the tube, care should be taken to insure that the surfaces 14 and 16 are accurately machined or otherwise formed. As the beads will be accurately formed so that the same are substantially uniform in size and shape and as there is little difficulty in maintaining the proper contour of the shoulders 14 and surfaces 16, a very strong and rigid union can be had.

Although the cylindrical wall surface 11 presented by the counter bore of the body member 10 very closely receives the end of the tubes 12, it is now preferred to provide separate means for sealing the annular space between the outer wall of the tubes and the cylindrical wall surface of the body member. Although a number of sealing means can be effectively used here, it is now preferred to use conventional O-rings 17 which are received within spaced circumferentially extending grooves 18 formed in the cylindrical wall surface 11 of the counter bore of the body member 10. These O-rings are preferably used with leather back-up washers 19 placed within each groove on opposite sides of the O-ring seated therein. As in conventional practice, the O-rings are of a diameter slightly greater than the depth of the grooves 18 and thus project inwardly of the cylindrical wall surface of the counter bore to sealingly engage each tube about the entire circumference thereof. The O-rings are formed of a resilient and substantially non-compressible material such as rubber and are effective to hold even relatively high pressures.

It should now be seen that the tubes 12 are rigidly anchored in an end-to-end relationship and that the jointure effected is sealed against the escape of fluids or the like carried by the tubes 12. This is so, for the only path of escape of a fluid is through the annular space intermediate the tubes 12 and the cylindrical wall of the counter bore of the body member 10. As this space is sealed by not only the O-rings 17 but also in part by the wall surface 11 itself, as well as by the walls of the recess enclosing the beads 13 and formed by the surfaces 14 and 16, there is little if any likelihood of fluid escaping or leaking from the union.

It might be pointed out here that even if one or both of the O-rings 17 should fail in use the seal is not completely destroyed, for the very close fit of the tubes within the counter bore and the engagement of the surfaces 14 and 16 with the beads will prevent all but a very small seepage of the fluid.

Figure 2:
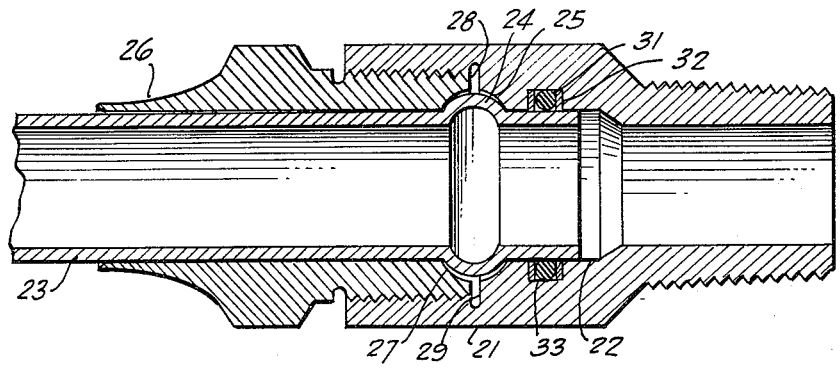
Fig. 2 is a longitudinal sectional view of a modified form of the coupling device of the present invention.
Figure 4:
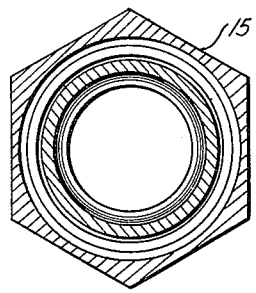
Fig. 4 is a section taken along line 4—4 of Fig. 1.

In the embodiment of the invention shown in Fig. 2, the coupling there shown comprises a sleeve-like body member 21 having a bore 22 presenting a cylindrical wall surface which closely receives the end of the tube 23. The tube 23, as in the previously described embodiment of the invention, is preformed through a die operation with a bead 24 which is adapted to engage a substantially toroidal shoulder 25 formed by an enlarged wall portion of the bore 22. The bead 24 is held in engagement with the shoulder 25 by a compression member here shown as a sleeve nut 26 formed in this embodiment of the invention with male threads engageable with female threads of the body member 21. The inner end of the sleeve nut 26 is formed with a toroidal surface 27 of substantially the same diameter as the toroidal shoulder 25 of the body member. The surface 27 coacts with the shoulder 25 to restrain movement of the bead 24, for they coact together to provide a recess of substantially the same size and shape as the external surface of the bead 24.

In this embodiment of the invention the toroidal surface 27 of the sleeve nut 26 compressively engages the bead 24 before the inner face 28 thereof engages the face 29 of the body member 21. This insures that the bead 24 will be compressively engaged between the surface 27 and the shoulder 25 to provide a rigid anchorage of the tube 23 before the sleeve seats against the body member.

As in the earlier described embodiment of the invention, an O-ring 31, together with the back-up washers 32, is used to seal the annular space between the exterior wall surface of the tube 23 and the internal cylindrical wall surface presented by the bore 22. The O-ring is mounted in a groove 33 circumferentially formed in the bore 22 intermediate the ends thereof so that the O-ring will effectively prevent seepage of the fluid carried by the tube 23 to the left as viewed in Fig. 2 and thence to atmosphere through either the threaded connection or around the bead and thence to atmosphere through the annular space between the sleeve nut 26 and the tube 23.

Here again the tube is rigidly anchored against longitudinal movement by the surface 27 and the shoulder 25. As explained during the description of the embodiment of the present invention shown in Fig. 1, the surface 27 and the shoulder 25 should be accurately formed so that they will coact with the root portions of the bead to not only rigidly anchor the bead and thus the tube against movement but also coact to augment the seal produced by the O-ring 31.

Figure 3:
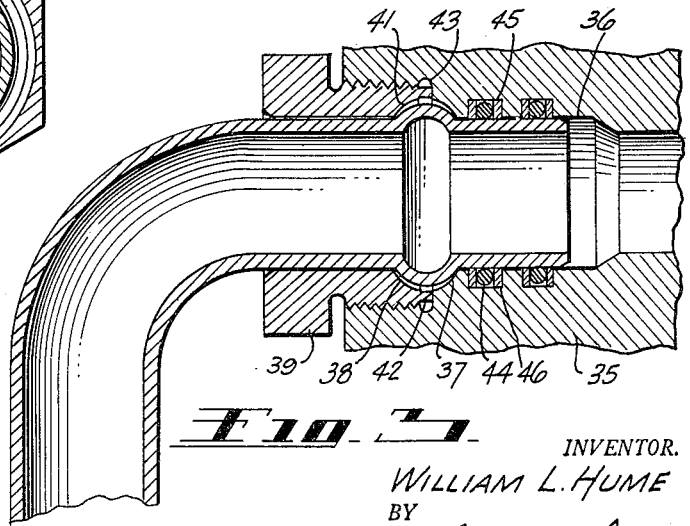
Fig. 3 is a sectional view similar to Fig. 2 but showing a still further modified form of the coupling device.

There is shown in Fig. 3 an embodiment of the coupling device of the present invention which can be used if a swivel connection is desired. The embodiment of the invention illustrated in Fig. 3 also shows the adaptation of the present invention to assemblies in which a tube 34 formed with a right angled bend is to be coupled to a device such as a pump or the like, the housing of which is indicated by the reference character 35. In such an installation the housing 35 may be formed with a bore 36 presenting an internal cylindrical wall surface for closely receiving the end of the tube provided with bead formed in the same manner as were the beads 13. The bore 36 is provided with an enlarged wall means forming a toroidal shoulder 37 against which the previously formed bead 38 seats. The bead 38 is held in engagement with the shoulder 37 by a collar or nut 39 closely sleeving the tube 34 and provided at its inner end with a substantially toroidal surface 41 of substantially the same diameter as the shoulder 37. The sleeve nut 39 is formed with male threads engageable with female threads formed about the wall of an enlarged portion of the bore 36 to the end that the sleeve nut may be drawn toward the housing 35 to compressively engage the bead 38 between the surface 41 and the shoulder 37.

To prevent the bead 38 from being so compressively engaged between the surface 41 and the shoulder 37 that the swivel action desired can not be had, means are provided for so locating the toroidal surface 41 relative to the shoulder 37 that said bead will revolve within the recess formed between the surface 41 and the shoulder 37 upon the application of a preselected rotational force to the tube 34. This means, in the now preferred embodiment of this form of the invention, comprises an index means formed by an annular extension 42 of the sleeve nut 39. The outer surface of the extension 42 is engageable with the surface 43 of the casing 35 and when brought into engagement with that surface will locate the surface 41 in such a position relative to the shoulder 37 that the bead 38, although held against free rotation within the recess, will nevertheless revolve therein upon the application of a preselected rotational force to the tube. It should be obvious that the relative disposition of the index means 42 and the surface 41 can be changed, to the end that the rotational force necessary to bring about rotation of the bead can be varied.

Although the shoulder 37 and the toroidal surface 41 will closely engage the bead 38, particularly the root portions thereof, as above explained, separate means are here again employed to seal the annular space between the tube 34 and the cylindrical wall surface presented by the bore 36. The separate sealing means again preferably comprises an O-ring 44, together with suitable back-up washers 45 seated within a groove 46 circumferentially formed in the bore 36 intermediate the ends thereof. As the tube 34 is mounted for rotational movement about an axis coincident with the axis of the bore 36, it may be desirable to use a pair of O-rings to accommodate any misalignment of the tube end received within the bore and the bore itself. In the preferred embodiment of the swivel form of the present invention two O-rings 44, spaced as shown, are used.

It should now be seen that in all embodiments of the invention illustrated the anchorage of the tube is effected by compressively engaging the preformed bead of the tube between rigid surfaces coacting to form a recess of substantially the same size and shape as the bead. The tube is thus rigidly or solidly anchored and there is no danger of the tube moving longitudinally once the jointure is established.

The particular disposition of the separate sealing means or O-rings very effectively seals each anchored tube and unlike previously proposed coupling devices, failure of the O-rings does not result in a complete destruction of the seal. This is so, for in each embodiment of the invention illustrated, the surfaces engaged about the beaded end of the tube will prevent a complete failure of the seal. Furthermore, any marring of the external surface of the bead or marring of the surfaces engaged about the bead does not impair the sealing action of the O-rings, so that the same care is not required in the assembly of the coupling device of the present invention as is required in the installation of the previously proposed devices in which the anchoring means also formed a part of the sealing means.

Although the now preferred embodiments of the present invention have been shown and described herein, it is to be understood that the invention is not to be limited thereto, for it is susceptible to changes in form and detail within the scope of the appended claims.

I claim:

1. A device of the type described, comprising: means presenting an inner cylindrical wall surface closely receiving the end portion of at least one tube having spaced from the inner end thereof, an external, annular bead having a toroidal exterior surface angularly intersecting the tube wall in two longitudinally spaced and opposed root-circles to define abutment shoulders; the inner cylindrical wall surface of said receiving means being radially enlarged adjacent the one end thereof in the form of a rigid toroidal abutment having a larger outside diameter, a smaller radius of curvature and a greater degree of inflection than the bead, with the toroidal surface of said abutment disposed radially outwardly of, and concentric with, the adjacent portion of the outer toroidal surface of said bead; a tube anchoring longitudinal compression member circumscribing said tube longitudinally outwardly of said bead and having an inner cylindrical wall surface radially enlarged adjacent said bead in the form of a complementary rigid toroidal abutment having the same radius of curvature as the first said abutment and with the toroidal surface thereof disposed radially outwardly of, and concentric with, the adjacent outer toroidal surface of said bead; and means for connecting said anchoring member with, and for drawing the same toward, said receiving means to directly apply solely to the abutment shoulders at the root circles of said outwardly extending tube-wall intersecting exterior bead surface tangential forces having equal and opposite longitudinal components which are concentrated on said shoulders; thereby to longitudinally couple said tube in said receiving means clampingly and to provide a sectionally crescent shaped clearance chamber in the form of a lune of revolution lying radially between said toroidal abutment surfaces and the exterior toroidal surface of said bead to accommodate radial outward movement of said bead under longitudinal contraction and expansion of said tube caused by thermal forces and by overtightening of said anchoring means.

2. A device of the type described, comprising: means presenting an inner cylindrical wall surface closely receiving the end portion of at least one tube having spaced from the inner end thereof, an external, annular bead having a toroidal exterior surface angularly intersecting the tube wall in two longitudinally spaced and opposed root-circles to define abutment shoulders; the inner cylindrical wall surface of said receiving means being radially enlarged adjacent the one end thereof in the form of a rigid toroidal abutment having a larger outside diameter, a smaller radius of curvature and a greater degree of inflection than the bead, with the toroidal surface of said abutment disposed radially outwardly of, and concentric with, the adjacent portion of the outer toroidal surface of said bead; said cylindrical wall having an annular, relatively broad and shallow, groove therein located intermediate said bead and the adjacent inner end of the tube and adapted to receive sealing means; a relatively resilient, non-compressibly deformable sealing member mounted annularly in said groove and flanked on each longitudinal side by a relatively non-resilient, compressibly deformable, rectangular section sealing member, said members projecting radially inwardly to sealingly engage the circumference of the tube and being compressed radially by the receiving member and the tube end to provide a single, cylindrical, flat surface contact between the sealing members and the tube wall, thereby to distribute the sealing effect of said receiving members and tube end together over a relatively wide area as compared to the groove depth and with a concentrated sealing force; a tube-anchoring member circumscribing said tube longitudinally outwardly of said bead and having an inner cylindrical wall surface radially enlarged adjacent said bead in the form of a complementary, rigid, toroidal abutment having the same radius of curvature as the first said abutment and with the toroidal surface thereof disposed radially outwardly of, and concentric with, the adjacent outer toroidal surface of said bead; and means for connecting said anchoring member with, and for drawing the same toward, said receiving means to apply all longitudinal coupling forces substantially tangentially to the abutment shoulders only of the bead, so that the bead takes all longitudinal coupling and clamping forces, relieving the seal from all longitudinal coupling and clamping forces; thereby to enable the sealing members to lie flat in their groove and to maintain their planar sealing contact with the tube end laterally untilted, thereby to enhance the sealing effect of said sealing members.

3. A device of the type described, comprising: means presenting an inner cylindrical wall surface closely receiving the end portion of at least one tube having spaced from the inner end thereof, an external, annular bead having a toroidal exterior surface angularly intersecting the tube wall in two longitudinally spaced and opposed root-circles to define abutment shoulders; the inner cylindrical wall surface of said receiving means being radially enlarged near the one end thereof in the form of a rigid annular abutment, the inner portion of which has a greater degree of inflection than the bead and the outer portion of which lies spaced radially outward of said bead to provide with said inner portion an annular clearance around said bead; a tube anchoring longitudinal compression member circumscribing said tube longitudinally outwardly of said bead and having an inner cylindrical wall surface radially enlarged adjacent said bead in the form of a rigid annular abutment extending outwardly with a greater degree of inflection than said bead and cooperating with said first abutment to provide an annular clearance chamber about the exterior toroidal surface of said bead to accommodate radial outward movement of said bead; said abutments contacting the abutment shoulders of said bead only at said opposed root circles to define two axially spaced, concentric, annular lines of contact to hold said tube in accurate axial alignment with said receiving means and said compression member; means for connecting said anchoring member with, and for drawing same toward, said receiving means to produce said line contact between said abutments and said abutment shoulders; and annular resilent sealing means mounted in said receiving means and adapted to engage the external surface of said tube in sealing relation; the accurate alignment of said tube relieving said sealing means of mechanical loads, thereby to enhance its sealing effect.

4. The device as claimed in claim 3 and, in addition thereto; index means carried by said anchoring means and engageable with said receiving means for so locating said abutments relative to said abutment shoulders that said bead is free to rotate about its axis upon the application of a relatively light rotational force to said tube.

WILLIAM L. HUME.

REFERENCES CITED

The following references are of record in the file of this patent:

UNITED STATES PATENTS

| Number | Name | Date |
|---|---|---|
| 188,213 | Weiss | Mar. 6, 1877 |
| 1,533,886 | Mueller et al. | Apr. 14, 1925 |
| 1,817,854 | Sorensen | Aug. 4, 1931 |
| 1,961,453 | Quarnstrom | June 5, 1934 |
| 2,377,196 | Walley | May 29, 1945 |
| 2,459,956 | Muller | Jan. 25, 1949 |
| 2,460,032 | Risley | Jan. 25, 1949 |
| 2,535,694 | Payne | Dec. 26, 1950 |